United States Patent [19]

Geller

[11] Patent Number: 4,493,992

[45] Date of Patent: Jan. 15, 1985

[54] ADAPTER CIRCUIT FOR TRACKBALL DEVICE

[75] Inventor: David A. Geller, Chicago, Ill.

[73] Assignee: Wico Corporation, Niles, Ill.

[21] Appl. No.: 410,261

[22] Filed: Aug. 23, 1982

[51] Int. Cl.$^3$ .............................................. H01J 40/14
[52] U.S. Cl. ................................... 250/221; 340/672; 340/709
[58] Field of Search ......................... 250/221, 231 SE; 340/709, 710, 670–672; 74/471 XY

[56] References Cited

U.S. PATENT DOCUMENTS 3,304,434  2/1967  Koster ........................... 250/231 SE
4,148,014  4/1979  Burson ............................... 340/709

OTHER PUBLICATIONS

Atari Print DP-188-02, Section 037241-01, "Mini-Trak Ball Circuitry."

Primary Examiner—Edward P. Westin
Attorney, Agent, or Firm—Emrich & Dithmar

[57] ABSTRACT

An adapter includes a program-controlled microprocessor provided with input means adapted to be coupled to the output of a trackball-type position control device, output terminals and selection means for selectively conditioning the processor for operation in either of two modes. In one mode the adapter converts the trackball output signals to a form which can be inputed to a port adapted for use with a switch-type joystick and yet includes both speed and direction information. In the other mode the adapter converts the trackball output signals to a form which can be inputed to a port adapted for use with a trackball device. A ladder network is connected to the adapter output terminals in its second mode for converting the output signals to a form which can be inputed to a port adapted for use with a proportional type joystick.

29 Claims, 18 Drawing Figures

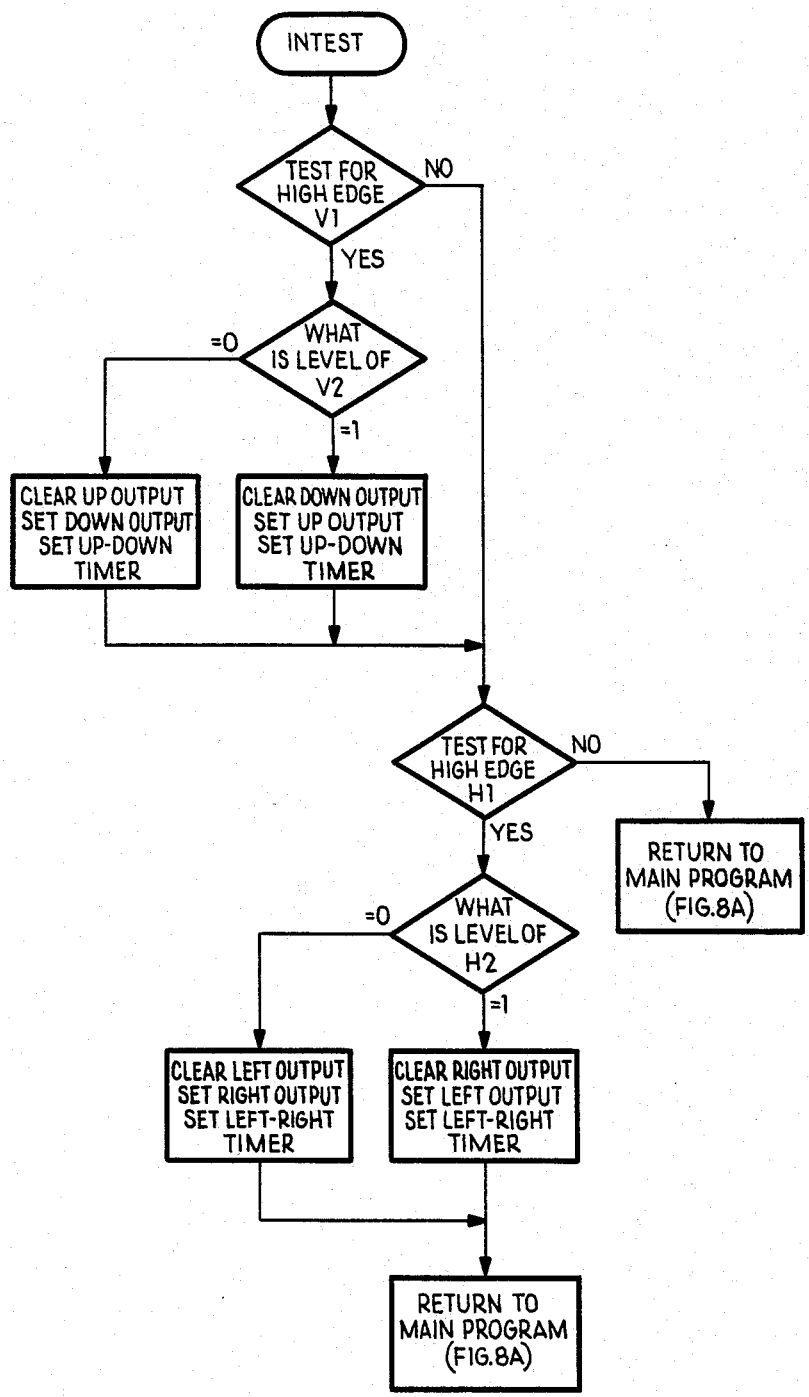

ADAPTER CIRCUIT FOR TRACKBALL DEVICE

BACKGROUND OF THE INVENTION

The present invention relates to position control devices, such as devices used for the control of the position of the cursor of a CRT display. In particular, the invention relates to adapter means for use with a trackball-type position control device.

Position control devices are used for cursor control in a wide variety of CRT display applications. One such application is in video games. For purposes of this application a "cursor" may be any CRT display pattern which is movable as a unit about the CRT screen. In general, two fundamental types of position control devices are used for this purpose, viz., trackball-type devices and joystick-type devices.

Trackballs and joysticks are typically incompatible in that they produce different types of output signals. Joysticks are of two types, viz., the switch type and the proportional type. Switch type joysticks provide only direction information, by producing a DC level for each of several switch contacts, respectively corresponding to different positions of the joystick, e.g., UP, DOWN, LEFT, and RIGHT. In applications where a switch-type joystick is used, a cursor will continue to move in the direction in which the joystick is held, for as long as it is held in that direction, and it will move at a predetermined rate under program control of the host processor in the associated video game.

A proportional-type joystick produces both speed and direction information and causes the cursor position to follow the position of the joystick. Thus, if the joystick is moved from its center position to its full UP position, the cursor will undergo a similar movement and will move at a rate which is proportional to the rate at which the joystick is moved. This type of joystick essentially produces two varying voltage levels which respectively correspond to the horizontal and vertical axes and vary in direct response to the components of movement of the joystick along these axes.

A trackball device also produces speed and direction information, but it does so in a fundamentally different way from a proportional joystick. The trackball device output consists of four pulse trains, a set of two for each of two orthogonal axes. Thus, components of rotation of the trackball about one axis generates one set of two pulse trains and components of rotation about the other axis generate another set of two pulse trains. The pulse repetition rates are directly proportional to the speed of rotation of the trackball about the corresponding axis, and the phase relationship of the two pulse trains in each set is related to the direction of rotation of the trackball about the corresponding axis.

Because of the fundamentally different types of outputs produced by these different types of position control devices, a video game which is designed for use with a joystick type position control device cannot be used with a trackball type position control device. This is a significant disadvantage, because trackball devices afford significantly more accurate and realistic position control than is afforded by joysticks, particularly as regards control of the speed with which the cursor moves. Furthermore, video games which use switch-type joystick inputs are not intended to accept speed information at all, since the cursor is intended always to move at the same speed as determined by program control.

Another drawback of existing devices is that the control circuits for trackball devices typically utilize from four to six separate integrated circuit chips and, therefore, are of relatively complex and expensive construction.

SUMMARY OF THE INVENTION

The present invention relates to an adapter circuit for a position control device which avoids the disadvantages of prior devices and affords additional structural and operating advantages.

It is a general object of this invention to provide an adapter for a trackball-type position control device which will permit the trackball device to be used with associated CRT control apparatus designed for use with joystick-type position control devices.

It is another object of this invention to provide an adapter of the type set forth, which permits the trackball device to be used with apparatus designed for use with either switch-type or proportional-type joysticks.

In connection with the foregoing object, it is another object of this invention to provide means for selectively conditioning the adapter to operate in two different modes for respectively adapting the trackball device to switch-type or proportional-type joystick inputs.

Still another object of this invention is the provision of an adapter circuit of the type set forth, which permits the trackball to be used either with CRT control apparatus designed for use with trackball devices or with CRT control apparatus designed for use with joystick devices.

Another object of this invention is the provision of a control circuit for a trackball device which is of simple and economical construction.

These and other objects of the invention are attained by providing an adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, the adapter comprising: input means for receiving the output signals of the trackball device, and processor means operating under stored program control and connected to the input means and having two pairs of output terminals respectively corresponding to two othogonal axes, the output terminals of each pair respectively corresponding to the opposite directions with respect to the associated axis, the processor means being responsive to each set of pulse trains for producing on one terminal of a corresponding pair of the output terminals an output pulse train continuing for as long as the trackball has a component of rotation in the corresponding direction, the repetition rate and the duration of the pulses in the output pulse train varying with the pulse repetition rate of the associated set of pulse trains from the trackball device.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is a functional block diagram of a prior art cursor control system incorporating a trackball type position control device;

FIG. 4 is a diagrammatic representation of a CRT screen on which a cursor moves under operator control by the use of a position control device;

FIG. 5 is a functional block diagram of a cursor control system incorporating an adapter constructed in accordance with and embodying the features of the present invention;

FIG. 6 is a partially block and partially schematic circuit diagram illustrating the microprocessor chip of the adapter of the present invention and associated input circuitry, with the microprocessor configured for operation in one mode in accordance with the present invention;

FIGS. 8A–8C are a program flow chart depicting the operational steps performed by the microprocessor of the adapter of the present invention in its two modes of operation.

DESCRIPTION OF THE PREFERRED EMBODIMENTS

Figure 1:
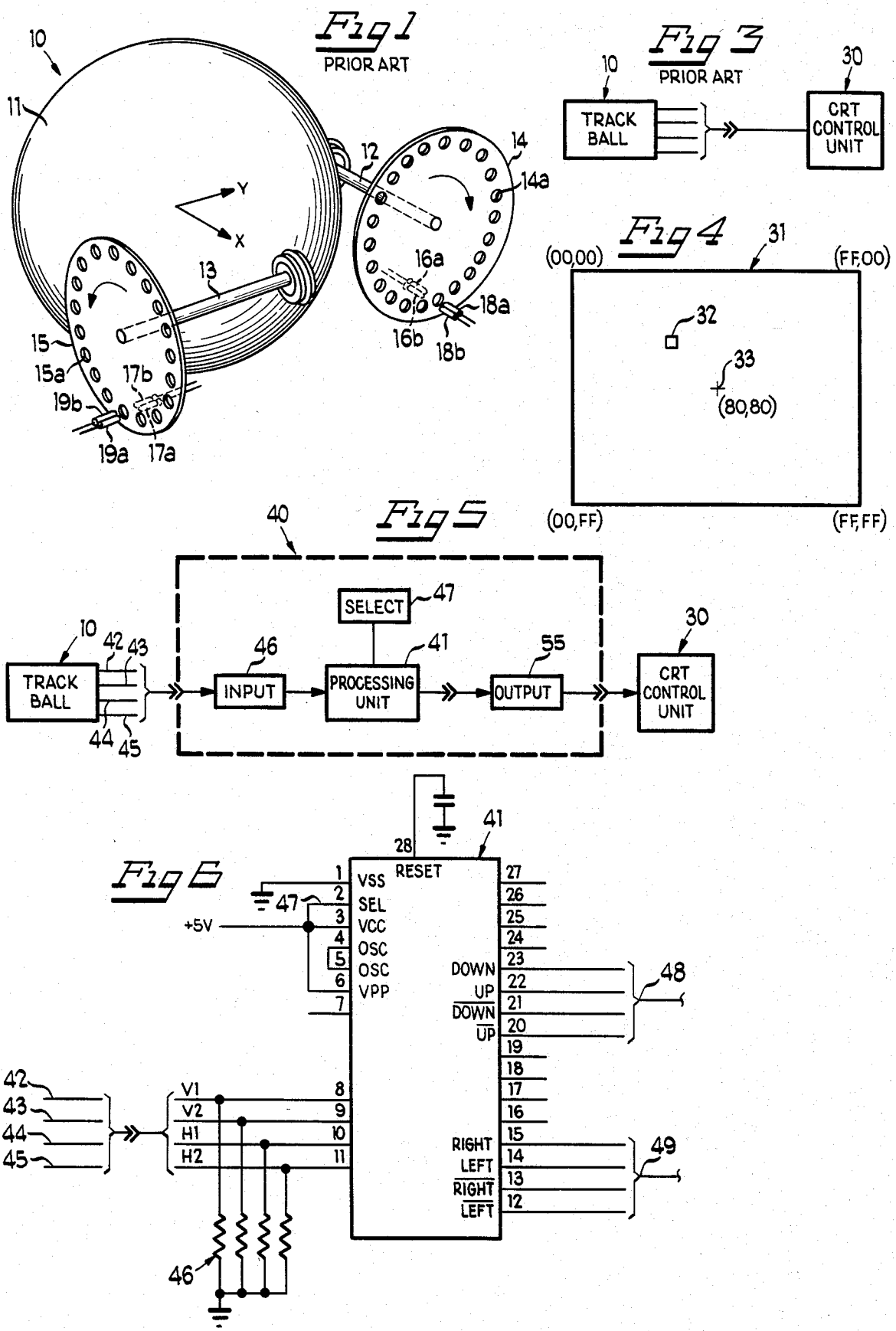
FIG. 1 is a diagrammatic perspective view of a prior art trackball device.

FIG. 1 is a simplified illustration of a typical trackball device, generally designated by the numeral 10. The device 10 includes a ball 11 mounted in a support "track" (not shown) for universal rotation in any direction. In use, the upper portion of the ball is typically exposed to access by a user so that it can be manually rotated. The surface of the ball 11 is frictionally coupled to two shafts 12 and 13, respectively disposed parallel to orthogonal X and Y axes which intersect at the center of the ball 11. The shafts 12 and 13 are mounted by suitable means (not shown) for free rotation about the axes thereof respectively in response to components of rotation of the ball 11 about the corresponding X and Y axes. Respectively fixedly secured to the shafts 12 and 13 for rotation therewith are code disks 14 and 15, respectively provided with apertures 14a and 15a therethrough equidistantly spaced apart circumferentially thereof. Respectively associated with the code disks 14 and 15 are light sources 16a and 16b and 17a and 17b disposed for directing light beams through the apertures 14a and 15a substantially perpendicular to the planes of the code disks 14 and 15. Respectively disposed on the opposite sides of the code disks 14 and 15 for receiving the light beams from the light sources 16 and 17 are pairs of light-responsive devices, such as photocells 18a and 18b and 19a and 19b.

In operation, when the ball 11 is rotated, its components of rotation about the X and Y axes will respectively cause rotations of the shafts 12 and 13 in directions which correspond to the direction of the components of rotation of the ball 11 and at speeds which are directly proportional to the speed of those components of rotation of the ball 11. By way of example, if the rotation of the ball 11 results in a clockwise rotation of the code disk 14, as viewed in FIG. 1, it is apparent that as one of the apertures 14a approaches and passes in front of the light sources 16a and 16b, first the photocell 18a will be illuminated and then the photocell 18b will be illuminated through that aperture. As the aperture 14a passes each light beam, the beam will be intercepted by the opaque portion of the code disk 14 between apertures. Preferably, the light sources, photocells and apertures are so arranged that each aperture 14a will intercept the beam from the light source 18b while it is still being intercepted by the beam from the light source 18a.

The output of each of the photocells 18a and 18b is a first voltage level when the photocell is not illuminated and a second higher voltage level when the photocell is illuminated. Thus, it will be appreciated that the output signal from each of the photocells 18a and 18b in response to rotation of the code disk 14 is a series of pulses 20a and 20b, which are depicted in idealized form in FIGS. 2(a) and (b), respectively. It will also be understood that the width of the pulses 20a and 20b and the spacing therebetween are inversely proportional to the speed of rotation of the code disk 14, low speed pulses being indicated generally at 21 and high speed pulses being indicated generally at 22. The direction of rotation of the code disk 14 can be determined by an examination of the phase relationship between the pulse trains from the photocells 18a and 18b. Thus, when the code disk 14 is rotating in a clockwise direction, as viewed in FIG. 1, the pulses 20a from the photocell 18a will lead the pulses 20b from the photocell 18b as illustrated from $t_0$ to $t_1$ in FIGS. 2(a) and 2(b). When the code disk 14 is rotating in the opposite direction, the pulses 20b from the photocell 18b will lead the pulses 20a from the photocell 18a. This latter type of rotation is illustrated after $t_1$ in FIGS. 2(a) and 2(b). It will be appreciated that the code disk 15 cooperates with the light sources 17a and b and the photocells 19a and b in the same manner, so the waveforms from the photocells 19a and b have not been shown. Thus, it can be seen that if the rising edges of the output pulses from the photocells 18a or 19a occur when the output from the corresponding photocell 18b or 19b is low, this indicates a clockwise rotation of the associated code disk 14 or 15, as viewed in FIG. 1, whereas if the rising pulse edges from photocells 18a or 19a occur when the output of the corresponding photocell 18b or 19b is high, this indicates a counter-clockwise rotation of the associated code disk 14 or 15.

Figure 2:
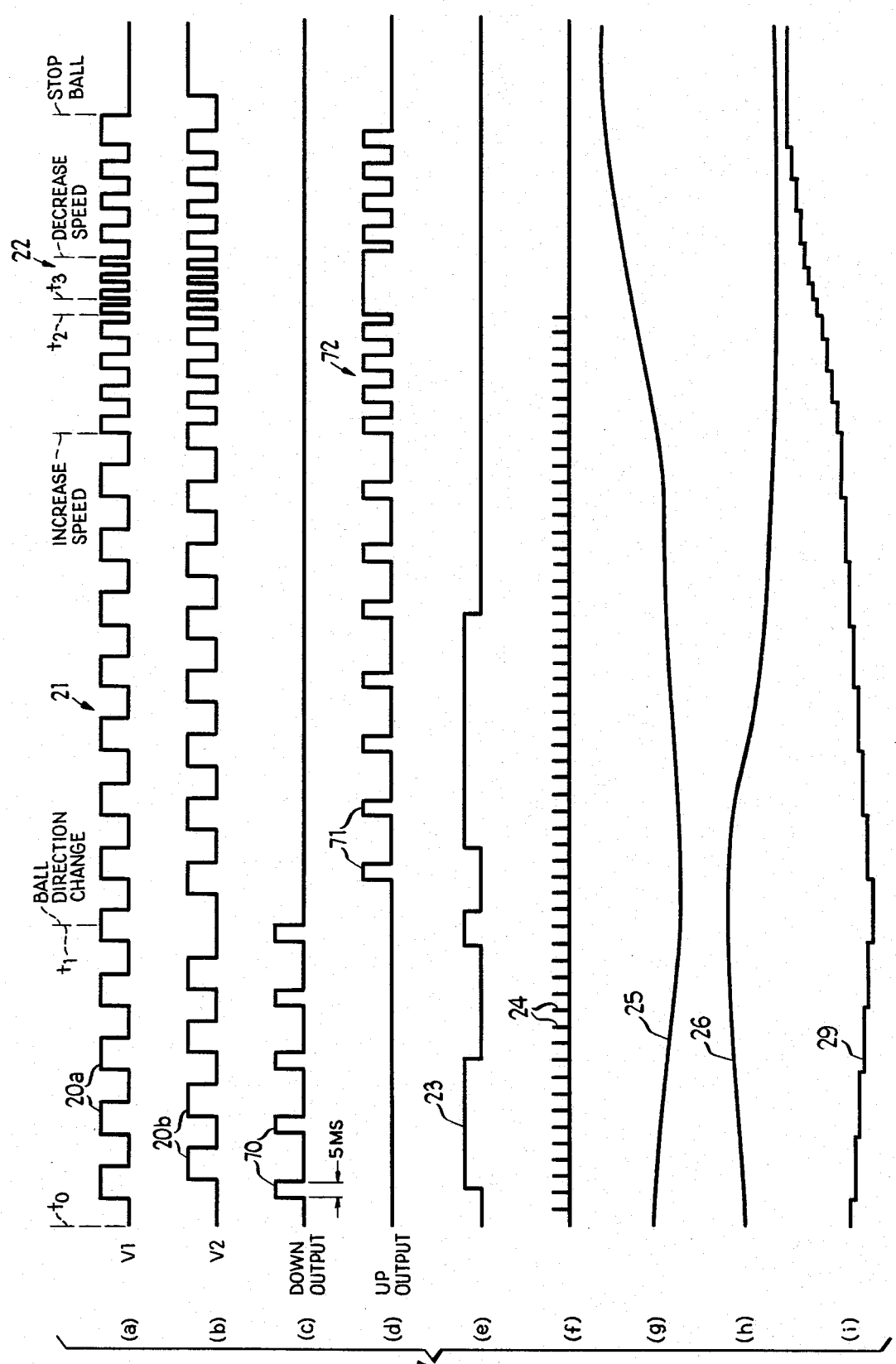
FIGS. 2a through 2i are waveforms representing the various output signals of conventional trackball and joystick devices and of the adapter of the present invention.

While the outputs of the photocells 18a and b are illustrated in FIG. 2 in idealized form as square waves, it will be appreciated that, in practice, the leading and trailing edges of the pulses are sloping. Thus, in order to process these signals, the typical trackball control circuit will first pass the pulse trains of FIGS. 2(a) and (b) respectively through wave shaping circuitry such as Schmitt trigger circuits to "square up" the pulses. Each set of two square-wave pulse trains is then fed to an edge trigger flip-flop circuit to compare the phase relationships and derive a direction signal. This direction signal and the output from one of the pulse trains is then in turn fed to a counter circuit for providing an n-bit parallel output representation of a CRT screen position. This n-bit output signal changes at a rate determined by the pulse repetition rate of the trackball output. Thus, it can be seen that, typically, the control circuit must include at least four integrated circuits, viz., one for the Schmitt triggers, one for the flip-flops and two separate counter circuits for the horizontal and vertical axes.

In FIG. 3 there is illustrated a typical prior art control system utilizing a trackball device 10 in combination with a CRT control unit 30, the latter including a CRT screen 31, illustrated in FIG. 4. The trackball device 10 cooperates with the CRT control unit 30 for controlling the movement of a cursor 32 across the CRT screen 31. The CRT control unit 30 may be a video game, which includes a computer processor for reading and interpreting the output signals from the trackball device 10 and utilizing them to control movement of the cursor 32.

More specifically, the n-bit output signals from the trackball counters are periodically read by the host processor of the CRT control unit 30, and the cursor 32 is moved to each position as it is read. Preferably, the sampling rate is of the same order of magnitude as the pulse repetition rate of the output pulses from the trackball device 10 when the ball 11 is rotating at its maximum speed. Thus, when the ball 11 has a rapid component of rotation about an axis, the corresponding counter circuit will have a different output position signal each time it is sampled so that the cursor 32 will move rapidly across the CRT screen 30. When the corresponding component of rotation of the ball 11 is slow, the counter output may not change for several sampling periods, so that the cursor will appear to move slowly across the screen 30.

A switch-type joystick typically has four switches respectively corresponding to UP, DOWN, LEFT and RIGHT directions, and as the joystick is moved selected ones of these switches are closed. When each switch is closed it produces an output DC level, as illustrated at 23 in FIG. 2(e), which will continue as long as the switch is held closed. If joystick is moved in a diagonal direction between two of the switches, they will both be closed simultaneously. In operation, each switch output is sampled by the host processor of the associated video game or the like at a predetermined sampling rate, the sampling pulses being indicated at 24 in FIG. 2(f). At each sampling point if the switch output signal is high the processor will cause the cursor 32 to move one unit across the screen 30 in the corresponding direction. Thus, e.g., if the joystick is held in the UP position, the cursor will move upwardly across the screen from the reference point 33 (typically at the center of the screen 30) at a fixed rate determined by the sampling rate, and this movement will continue until the joystick is moved back to its neutral position opening the UP switch. The user can control direction of cursor movement, but not speed.

In a proportional-type joystick device the joystick is connected to the movable contacts of two potentiometers respectively associated with the two orthogonal axes. As the joystick moves, the sliders move along the variable resistors of the potentiometers for varying the output voltages therefrom. Thus, the output voltages 25 and 26 from the potentiometer are respectively directly proportional to the positions of the slider contacts therealong. Each of the output voltages 25 and 26 corresponds to a position of the cursor 32 on the CRT screen 30 along a corresponding one of the orthogonal axes, as illustrated in FIGS. 2(g) and (h). Thus, it will be appreciated that the movement of the cursor 32 across the screen 30 follows the movement of the joystick in both direction and speed.

Referring to FIG. 5 of the drawings, there is illustrated an adapter, generally designated by the numeral 40, constructed in accordance with and embodying the features of the present invention, for connection to the output terminals of a trackball device 10, for converting the output signals therefrom to forms respectively acceptable to input ports of video apparatus configured for use with trackballs and switch-type joysticks and proportional-type joysticks. More specifically, the adapter 40 includes a processing unit 41 which may be in the form of a microprocessor chip, provided with an input network 46 which is in turn connected to the output lines 42, 43, 44 and 45 of the trackball device 10. The processor unit 41 is provided with a select input 47 for selectively conditioning the processing unit 41 for operation in either of two modes, viz., a pulse width modulation mode and a counting mode. The output of the processing unit 41 may be connected to the CRT control unit 30, either directly or through an output network 55, depending upon the mode in which the processing unit 41 is operating and the type of position control input for which the CRT control unit 30 is designed.

Referring now to FIG. 6 of the drawings, the adapter 40 is illustrated in greater detail, configured for operation in its pulse width modulation mode. The processing unit 41 is a microprocessor chip, preferably an 8-bit microcomputer unit such as that sold by Motorola, Inc. under Model No. MC6805P2. The microprocessor chip has 28 I/O terminals. When the processing unit 41 is configured for operation in the pulse width modulation mode, the terminals are connected as illustrated in FIG. 6. More specifically, terminal 1 is the Vss input which is connected to ground. Terminals 3 and 6 are the Vcc and Vpp inputs, which are connected to an external +5 VDC supply. Terminal 2 is the select input 47 which, in this pulse width modulation mode is connected to the +5 VDC supply. Terminals 4 and 5 are connected together and to an internal clock oscillator on the microprocessor chip. Terminal 7 is not connected. Terminal 28 is a reset terminal connected to ground through a suitable capacitor. Terminals 8 through 11 are connected respectively to the outputs of the trackball device 10 via the input network 46. More specifically, the terminals 8 through 11 receive the V1, V2, H1 and H2 output pulse trains from the trackball device 10. The input network 46 is a network of resistors respectively connected between the terminals 8 through 11 and ground.

Terminals 12 through 15 are output terminals which comprise a horizontal output port 49, while terminals 20 through 23 comprise a vertical output port 48. More specifically, terminals 14, 15, 22 and 23, respectively carry LEFT, RIGHT, UP and DOWN output signals, each of which is a two-level signal which is either high or low and is the reciprocal of the opposite direction output. Thus, when the LEFT output is high, the RIGHT output is low and vice versa. Also, the signals at terminals 12 and 13 are respectively the reciprocals of those at terminals 14 and 15, while the signals at terminals 20 and 21 are respectively the reciprocals of those at terminals 22 and 23. These reciprocal outputs are provided as a convenience and are used in the alternative. Thus, either terminals 14, 15, 22 and 23 will be used or terminals 12, 13, 20 and 21 will be used, but both sets will not be used simultaneously. This alternative arrangement is provided because switch-type joysticks can be connected in either of two different polarities, viz., one which produces a high output when the joystick switch is closed, and another which produces a low output when the joystick switch is closed. Reciprocal output ports of the processing unit 41 permit it to be used with a CRT control unit 30 which is designed for use with either polarity joystick connection.

Figure 7:
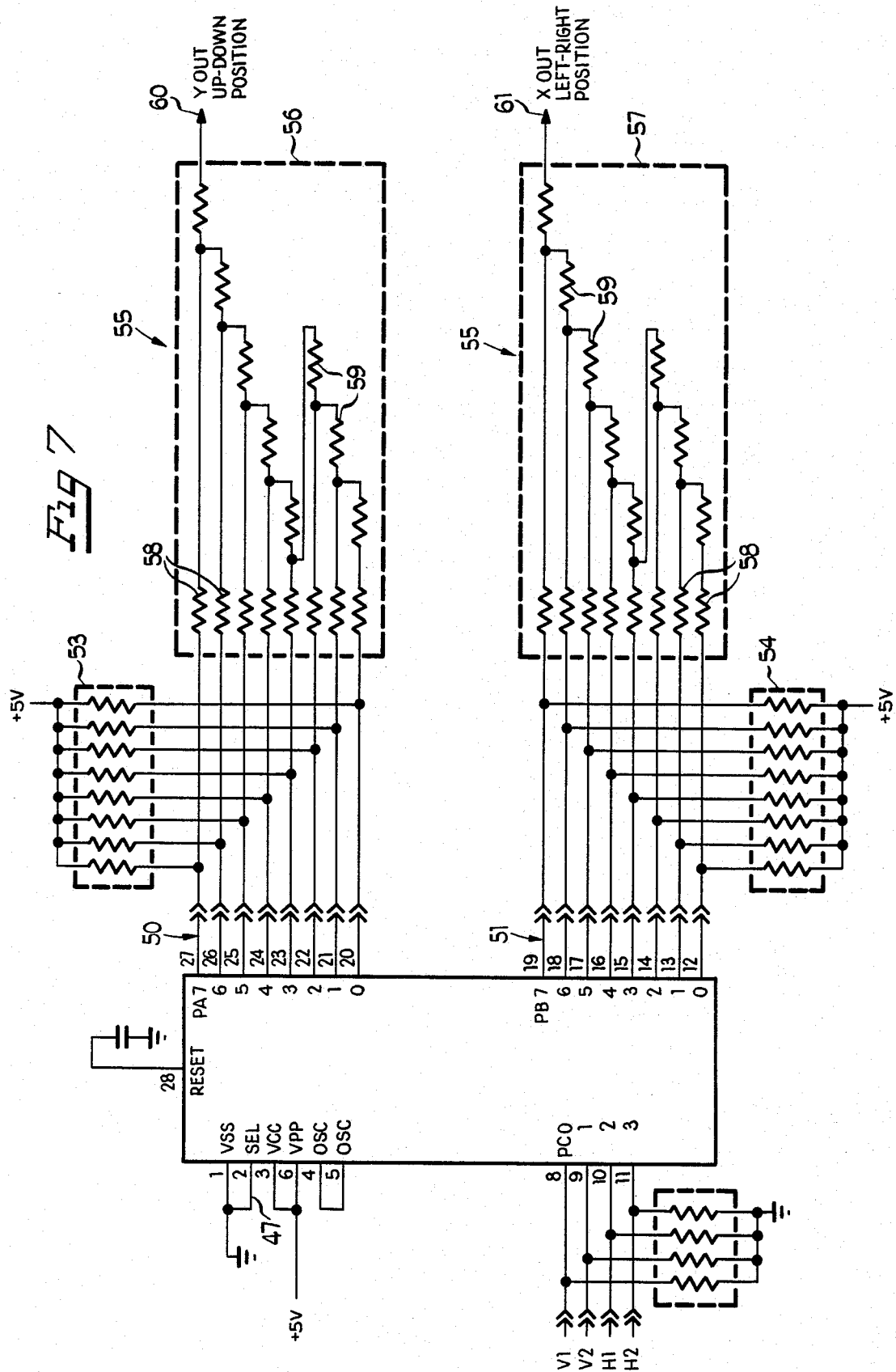
FIG. 7 is a circuit diagram similar to FIG. 4, illustrating the microprocessor configured for operation in a second mode and including an output circuit.
Figure 8A:
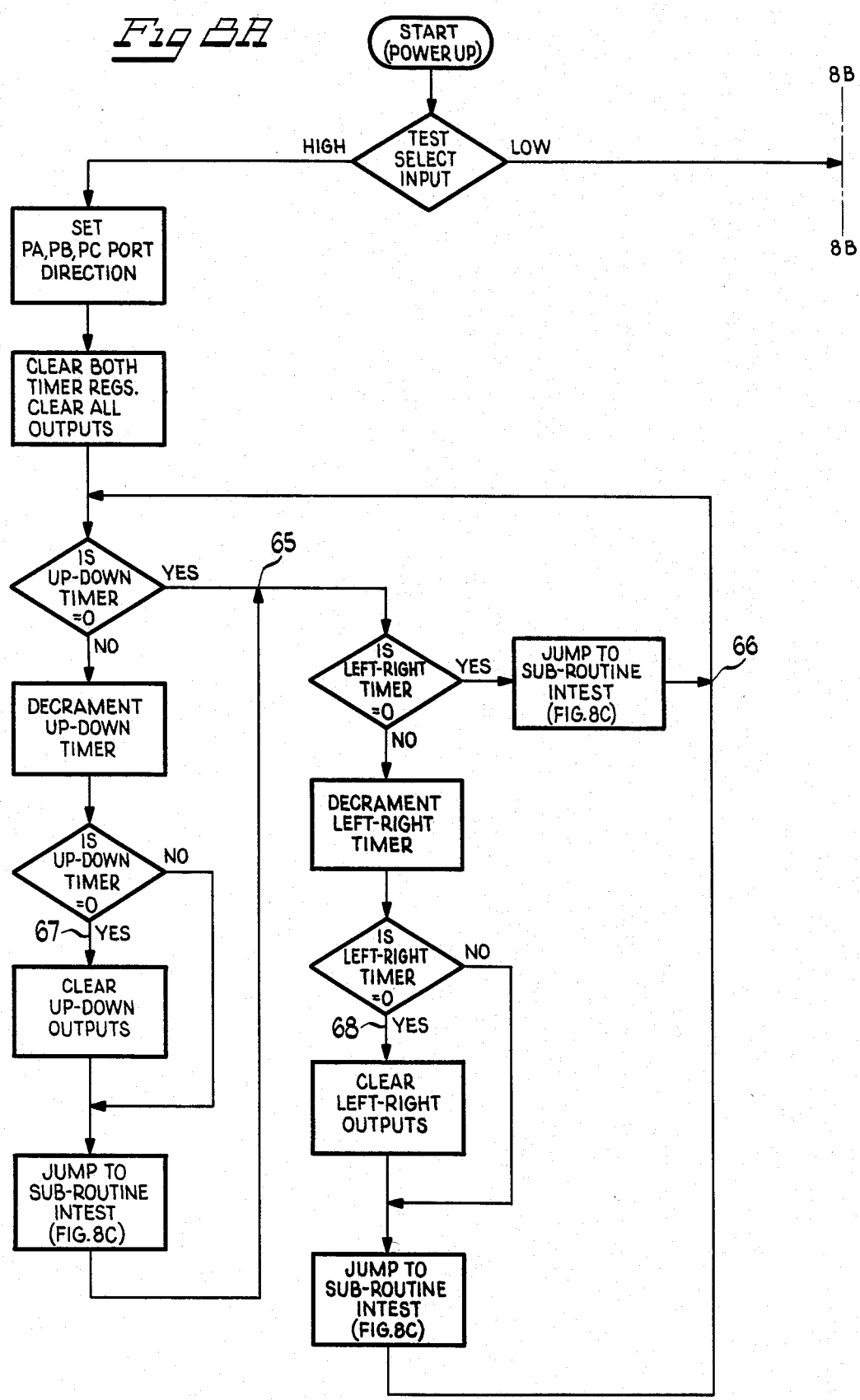
Figure 8B:
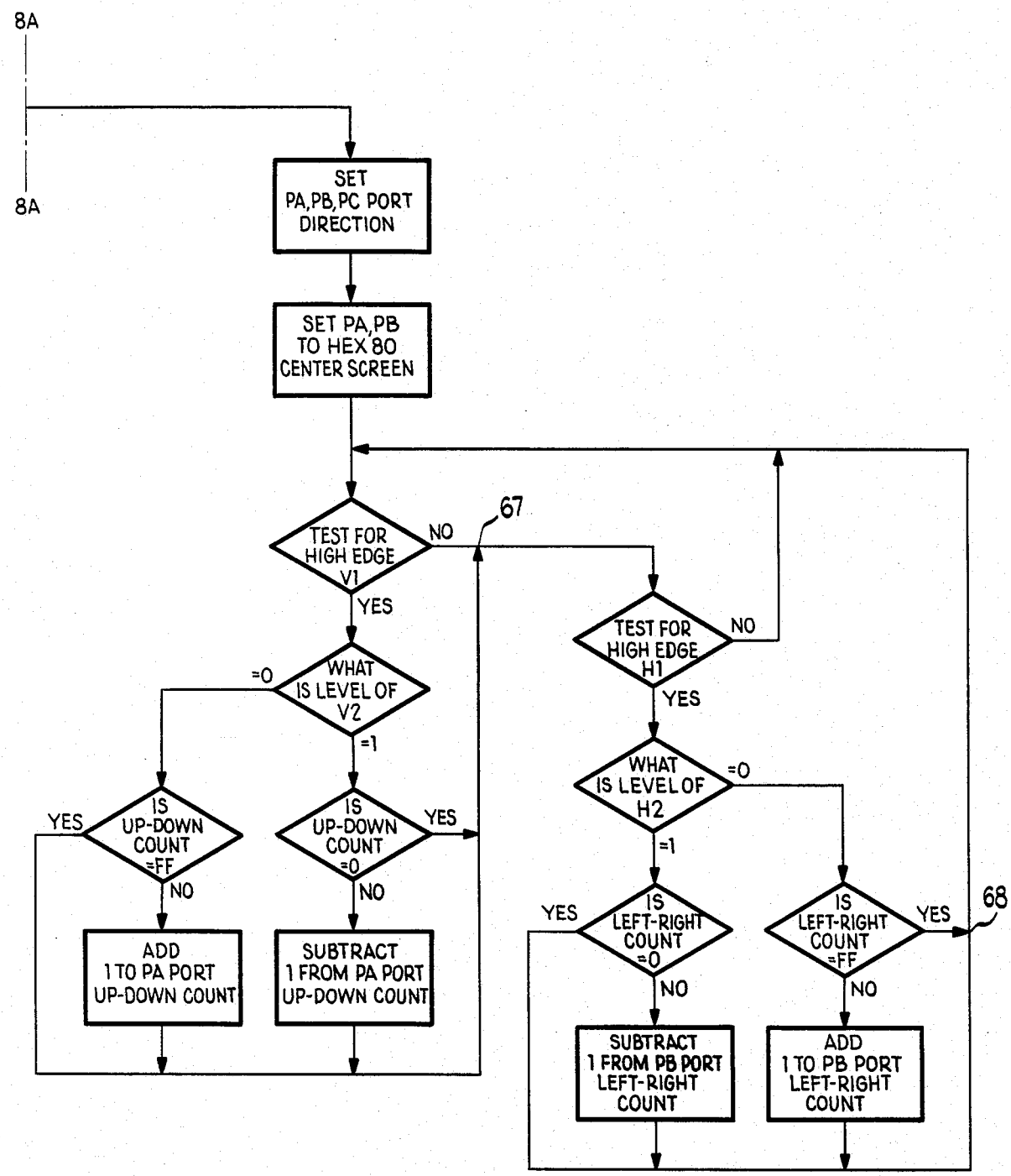

The processing unit 41 operates under stored program control, the program being illustrated in the flow chart of FIGS. 8A–8C. More particularly, referring to FIG. 8A, when the adapter 40 is powered up, it first tests the select input 47 to determine whether it is high or low. If it is high, as in FIG. 6, the system sets the PA, PB and PC port directions for operation in the pulse width modulation mode. In this regard, the PA port comprises terminals 20 through 27, the PB port comprises terminals 12 through 19 and the PC port comprises terminals 8 through 11 of the microprocessor chip (see FIG. 7). For the pulse width modulation mode of operation, the ports are arranged as in FIG. 6, i.e., with terminals 8 through 11 arranged as inputs, and terminals 12 through 15 and 20 through 23 arranged as outputs, the other terminals of the ports not being connected. The processing unit 41 includes two timing registers comprising a vertical or UP-DOWN timer and a horizontal timer. After the port directions have been set, the program next clears both of these timer registers and clears all the output terminals.

Next the program asks if the UP-DOWN timer equals zero, i.e., has timed out. In this case it has because it has just been cleared. Therefore, the program moves to the right and asks if the LEFT-RIGHT timer has timed out. It has, since it has also just been cleared so the program moves to the right and jumps to the subroutine INTEST, illustrated in FIG. 8C. In the INTEST routine, the program first tests input terminal 8 for the presence of a leading pulse edge in the V1 output from the trackball device 10. If it finds none, it next tests input terminal 10 for the presence of a rising pulse edge in the H1 output from the trackball device 10. If none is found, the system returns to the main program at point 66 (FIG. 8A) and again asks if the UP-DOWN timer has timed out. Thus, the program will continue cycling along this main sampling loop until it finds a rising pulse edge on either of the input terminals 8 or 10, indicating an output from the trackball device 10.

When it finds one (see FIG. 8C), for example in the V1 output (see FIG. 2(a)), it then tests the input terminal 9 and asks whether the level of the V2 output (FIG. 2(b)) from the trackball device 10 is high or low, i.e., equal to one or zero. If the V2 output is low, this means that the trackball has a component of rotation in the DOWN direction, so the program clears the UP output terminal 22, and sets the DOWN output terminal 23 to a high output signal level, designated 70 in FIG. 2(c), and then sets the UP-DOWN timer. The timer is set by loading into it a predetermined count value which, in the preferred embodiment is the hexadecimal value 1F, which corresponds to a decimal count of 32.

If, on the other hand, the V2 trackball output had been high, this would have designated a phase relationship between the V1 and V2 pulse trains indicating that the trackball has a vertical component of rotation in the UP direction. In this case, the program would have cleared the DOWN output terminal 23 and set the UP output terminal 22 to a high output voltage value, designated 71 in FIG. 2(d), and then set the UP-DOWN timer. When the program detects the direction of rotation, it is necessary to clear the output terminal for the opposite direction since it is possible for the trackball 11 substantially instantaneously to reverse its direction of rotation about a given axis. Clearing of the opposite direction output prevents the simultaneous appearance of output signals on both the UP and DOWN output terminals 22 and 23.

The program next tests the input terminal 10 for a rising voltage edge in the H1 output signal from the trackball device 10. If it finds none it returns directly to the main calling program at point 66 (FIG. 8A). If it finds one, it then checks the level of the H2 output signal on input terminal 11 to determine the direction of rotation of the trackball 11 about the X axis. If the H1 rising edge occurs when the H2 output is low, this indicates a component of rotation of the trackball 11 in the right-hand direction, while if it occurs when the H2 output is high, it indicates a component of rotation of the trackball 11 in a left-hand direction. Thus, the program sets the appropriate output 14 or 15 to a high output level (not shown), clears the other one and sets the LEFT-RIGHT timer in the same manner as was described above with respect to the vertical direction tests. The system then returns to the main program at point 66 (FIG. 8A).

When the program next checks to see if the UP-DOWN timer timed out, it finds that it has not because it has just been set. Accordingly, the program decrements the timer by one count and again asks if it has timed out. Since it has not, the program again jumps to the sub-routine INTEST and again tests for rising pulse edges on the V1 and H1 trackball outputs. If the trackball is rotating very slowly about the Y axis the output pulses in the V1 trackball output will be spaced far apart, as indicated at 21 in FIGS. 2(a) and (b), so this time the program will not find a rising pulse edge. For the same reason, it will not find a rising pulse edge on the H1 output, so the system will return to the main program at point 65 (FIG. 8A) and will then ask is the LEFT-RIGHT timer has timed out. It has not since, it is just been set, so the program will decrement this timer by one count, and then again ask if it has timed out. Since it has not, the program will again jump to the sub-routine INTEST and again check for the presence of rising pulse edges on the V1 and H1 trackball outputs. Finding none, it will return to the calling program at point 66.

The program will continue cycling around the main sampling loop in this manner, decrementing the horizontal and vertical timers one count for each cycle until the timers have timed out after 32 counts. At that time, the program will, at points 67 and 68, detect that the timers have timed out and clear the UP-DOWN and LEFT-RIGHT outputs before jumping to the subroutine INTEST to continue looking for trackball output signals.

In the preferred embodiment of the invention the UP-DOWN and LEFT-RIGHT timers will time out after about 5 milliseconds. This means that when a trackball output pulse is detected the appropriate microprocessor chip output will go high and stay high for 5 milliseconds if no other trackball output pulse is detected in the interim. Referring to FIGS. 2(c) and (d), when the trackball 11 is rotating very slowly, the UP-DOWN (and LEFT-RIGHT) timers will always time out between trackball output pulses and, indeed, there will be a considerable distance between the 5 milliseconds UP and DOWN (or LEFT and RIGHT) timer output pulses 70 and 71. As the speed of rotation of the trackball 11 increases, the distance between these output pulses 70 and 71 becomes less as indicated generally at 72, as the distance between the trackball output pulses becomes less.

When the trackball 11 is rotating very fast the the pulses in the V1 and H1 outputs thereof are spaced apart less than 5 milliseconds. Thus, referring to FIG. 2(a), for example, the first trackball output pulse may begin at time $t_2$, starting a microprocessor output pulse 71 at the same time and then, at time $t_3$, the next trackball output pulse appears. Thus, the timer is again reset for a 5 millisecond time period. The microprocessor output will thus continue at a high level until the speed of rotation of the trackball in that direction is reduced to a point where the trackball output pulses are more than 5 milliseconds apart.

It is a significant aspect of the present invention that the output signals at terminals 22 and 23 of the processing unit 41 are in a form which can be applied directly to the input port of a CRT control unit 30 which is adapted for use with a switch-type joystick input. Thus, the CRT control unit 30 will sample these output signals in the same way it would sample a switch-type joystick output, as indicated in FIG. 2(f). When the trackball 11 is rotating very fast, as illustrated at 22 in FIG. 2(a), the output signal (see FIG. 2(d)) on the corresponding microprocessor output terminal 22 or 23 will be a continuous DC level which is of the same type as the output signal from the switch-type joystick and the operation of the CRT control unit 30 will be identical to its operation with the joystick input.

When the trackball is rotating more slowly, so that the pulse width modulated output pulses 70 and 71 from the processing unit 41 are spaced apart, as in FIG. 2(c), the CRT control unit 30 will see a high output level for 2 or 3 sampling cycles and then will see a low output level for several sampling cycles. Thus, the cursor 32 will move 2 or 3 increments, then stop for a few increments, then move another 2 or 3 increments in an intermittent type motion. However, the sampling rate of the CRT control unit 30 is so fast and the time delay between output pulses 70 and 71, while relatively long in comparison to the sampling rate, are in absolute terms so small that the intermittent stopping of the cursor 32 is not noticeable to the human eye and the cursor 32 appears to move slowly in a substantially continuous manner. Thus, it can be seen that by the present invention operating in the pulse width modulation mode, a trackball device 10 can be utilized with a CRT control unit 30 adapted for a switchtype joystick input, and the trackball will operate as a trackball rather than as a joystick and control both speed and direction of the CRT cursor.

Referring now to FIG. 7 of the drawings, the adapter 40 is illustrated with its terminals arranged and connected for operation in its counter mode. In this arrangement, the terminals of the processing unit 41 are directed in a manner similar to that in the pulse width modulation mode, with the exception that the SELECT terminal 2 is connected to ground rather than to the +5 VDC supply. The terminals 8 through 11 are again arranged as an input port PC, and are respectively connected to the trackball device outputs through the input resistance network 46. The terminals 12 through 27 are again arranged as output terminals, comprising the vertical and horizontal ports PA and PB, but in this case all of the output terminals are connected, the terminals 20 through 27 comprising a parallel 8-bit vertical port 50 and the terminals 12 through 19 comprising a parallel 8-bit horizontal port 51.

In this counter configuration, the output ports 50 and 51 can be connected to a CRT control unit 30 either directly or through the output circuit 55, which in the preferred embodiment comprises a resistance ladder network. More particularly, the output circuit 55 includes resistance packs 53 and 54, each comprising 8 resistors respectively connected between the terminals of the output ports 50 and 51 and the +5 VDC supply. The output circuit 55 also includes two cascade resistance networks 56 and 57, respectively associated with the output ports 50 and 51 of the microprocessor chip 41. The cascade networks 56 and 57 are of identical construction, each including eight resistors 58 and eight resistors 59, each output terminal of the corresponding output port of the microprocessor chip being connected in series with one of the resistors 58 and one of the resistors 59. The distal end terminal of each resistor 59 is in turn connected to the junction between the resistors 58 and 59 of the next succeeding output terminal of the corresponding output port. The distal end terminals of the resistors 59 connected to the last output terminals of the ports 50 and 51 are respectively connected to output terminals 60 and 61 of the cascade networks 56 and 57. It will be appreciated that the input and output terminals of the output circuit 55 may be provided with suitable plug connections to facilitate connection and disconnection.

In operation, the adapter 40 in its counter configuration is responsive to each horizontal and vertical pulse signal from the trackball device 10 for converting it to a parallel 8-bit digital output signal representative of a position along the X or Y axis on the CRT screen 31 is hexadecimal code. The signals can be fed directly to the input ports of a CRT control unit 30 which is adapted for use with a trackball device input, and each 8-bit signal will cause the cursor 32 to move to the corresponding position on the CRT screen 31. The cursor will move as fast as the signals appear, which is determined by the rate at which the input pulses are fed from the trackball device 10.

If the CRT control unit 30 is adapted for use with a proportional-type joystick input, then the output circuit 55 is connected between the input port of the CRT control unit 30 and the output ports 50 and 51 of the adapter 40 in its counter mode. The output circuit 55 serves to convert each of the parallel 8-bit digital output signals from the processing unit 41 to a corresponding analog DC voltage level to simulate the output signal from a proportional-type joystick. However, instead of moving continuously from level to level, the output signals from the output circuit 55 will move in stepwise fashion from level to level, as indicated at 29 in FIG. 2(i), which illustrates the vertical output signal. The steps will occur at such a rapid rate, however, that they will not be noticeable to the human eye and, therefore, the cursor 32 will appear to move continuously across the CRT screen 31, the speed of movement being determined by the speed of rotation of the trackball 11. It will be appreciated that the horizontal output signals are generated in the same manner and are, therefore, not illustrated.

Referring now to FIG. 8B of the drawings, the portion of the program which controls the operation of the processing unit 41 in its counter mode will now be described. When the adapter 40 is first powered up, the program first tests the SELECT input terminal 47 of the processing unit 41 to see if it is high or low. If it is found to be low, the system will recognize that the microprocessor chip is configured in its counter mode and will proceed to the right to FIG. 8B. The program will then first set the directions of the PA, PB, and PC ports for operation in the counter mode and will then set the PA and PB output ports 50 and 51 to a parallel 8-bit hexadecimal count 80, which corresponds to the center position 33 on the CRT screen 31.

The program then samples the input terminal 8 for a rising pulse edge in the V1 output from the trackball device 10. If it does not find one, the program will proceed to the right and sample the input terminal 11 for a rising pulse edge in the H1 output from the trackball device 10. If it does not find one it will return and again sample the input terminal 8. This sampling loop will continue at a predetermined rate until a rising pulse edge is detected in either the V1 or the H1 trackball outputs. When a rising pulse edge is detected, for example in the V1 pulse train (see FIG. 2(a)), the program next checks the level of the V2 trackball output signal (FIG. 2(b)) at terminal 9 to see if it is high or low. If the V2 signal is low this indicates that the trackball is moving in a DOWN direction, and if it is high it indicates an UP direction.

The program next checks to see if the cursor 32 is at the edge of the screen 31. More specifically, if, for example, the V2 level is high, indicating an up count, the program checks to see if the UP-DOWN counter is at hexadecimal 00, which corresponds to the top edge of the CRT screen 31. If it is not, the program subtracts one from the UP-DOWN counter and the corresponding 8-bit output signal at port 50, causing the cursor 32 to move up one unit. Then the program returns to the sampling loop at point 67 to sample the H1 output of the trackball device 10. If the program had detected that the V2 level was low, indicating a down count, the system would first check to see if the UP-DOWN counter was at hexadecimal FF, which corresponds to the bottom edge of the CRT screen 31. If not, it would add one count to the UP-DOWN counter and the corresponding 8-bit output signal at port 50, causing the cursor 32 to move down one unit. Then the program returns to the sampling loop at point 67.

If, on the other hand, the program had found that the UP-DOWN counter was at hex zero 00 the up count or at hex FF for the down count, it would have returned directly to the sampling loop at point 67 without changing the count in the UP-DOWN counter. This is to prevent "wraparound" of the cursor 32. Thus, when the cursor 32 is at the top edge of the CRT screen 31, if the counter is decremented the cursor will jump to the bottom of the screen 31, i.e., it will "wraparound" the back of the screen. Similarly, if the cursor 32 is at the bottom of the CRT screen 31 and the counter is incremented, the cursor 32 will jump to the top of the screen 31. If the application is one in which "wraparound" of the cursor 32 is not objectionable, the test for the UP-DOWN counter condition can be eliminated.

The same sequence then takes place with respect to the LEFT-RIGHT counter. Thus, the program first samples the H1 trackball output, and if it finds a rising pulse edge it then checks the level of the H2 output to determine if the direction is LEFT or RIGHT. The program then checks the LEFT-RIGHT counter condition to determine if it is hex 00 in the case of a LEFT count or hex FF in the case of a RIGHT count, and, if the cursor 32 is not in a condition to "wraparound", the program then increments or decrements the counter as indicated to move the cursor 32 left or right. The program then returns to the main sampling loop at point 68. If the program finds that the cursor is in a "wraparound" condition, it will skip the incrementing and decrementing step and will return immediately to the main sampling loop at point 68.

It will be appreciated that by reason of the "wraparound" prevent portion of the program, when the cursor 32 is moved to the edge of the CRT screen 31 in a given direction, it will stay at the edge until the trackball direction is changed to move the cursor 32 back toward the center of the screen 31.

In summary, when the processing unit 41 is operating in its counter mode, it responds to each input pulse from the trackball device 10 to increment or decrement a corresponding counter to move the cursor 32 one unit in the corresponding direction. Accordingly, if the trackball 11 is rotating slowly, the output pulses therefrom will be widely spaced, the adapter outputs will change at a slow rate and the cursor 32 will appear to move slowly across the CRT screen 31. While the cursor movement is, in fact, intermittent, the pulse repetition rate is such that the movement appears to be substantially continuous to the human eye. As the trackball 11 rotates faster the adapter outputs change faster and the cursor 32 moves more rapidly across the CRT screen 31.

From the foregoing, it can be seen that there has been provided an adapter for a trackball device which permits the trackball device to be used with a CRT control unit, regardless of whether the CRT control unit is adapted for use with a trackball or with a switchtype joystick or with a proportional-type joystick input. There has also been provided an adapter of the type forth which can replace a trackball control circuit with a programmable microprocessor chip of simple and economical construction.

I claim:

1. An adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said adapter comprising: input means for receiving the output signals of the trackball device, and processor means operating under stored program control and connected to said input means and having two pairs of output terminals respectively corresponding to two othogonal axes, the output terminals of each pair respectively corresponding to the opposite directions with respect to the associated axis, said processor means being responsive to each set of pulse trains for producing on one terminal of a corresponding pair of said output terminals an output pulse train continuing for as long as the trackball has a component of rotation in the corresponding direction, the repetition rate and the duration of the pulses in said output pulse train varying with the pulse repetition rate of the associated set of pulse trains from the trackball device.

2. The adapter of claim 1, wherein said processor means has four pairs of output terminals, the output pulse trains on two of said pairs of said output terminals being respectively reciprocals of the output pulse trains on the other two pairs of said output terminals.

3. An adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said adapter comprising: input means for receiving the output signals of the trackball device; and processor means operating under stored program control and connected to said input means and having two n-bit parallel output ports respectively corresponding to 2 orthogonal axes, where n is an integer greater than one, said processor means being responsive to each set of pulse trains for producing at one of said output ports n-bit parallel coded digital signals representative of a position along the corresponding axis.

4. The adapter of claim 3, and further including output means connected to said output ports of said processor means for converting each of said n-bit parallel coded digital signals to an analog signal proportional to the magnitude of the count represented by said n-bit parallel coded digital signal.

5. The adapter of claim 4, wherein each of said n-bit parallel coded digital signals is converted to a DC level.

6. The adapter of claim 4, wherein said output means comprises a resistance ladder network.

7. The adapter of claim 3, wherein n is eight.

8. The adapter of claim 7, wherein said 8-bit parallel coded digital output signal is in the hexadecimal code.

9. An adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said adapter comprising: input means for receiving the output signals of the trackball device; processor means operating under stored program control and connected to said input means and having a plurality of output terminals; and selector means associated with said processor means for selectively conditioning said processor means for operation in either of first and second modes; said processor means in the first mode thereof having two pairs of said output terminals respectively corresponding to two orthogonal axes, the output terminals of each pair respectively corresponding to the opposite directions with respect to the associated axis, said processor means being responsive to each set of pulse trains for producing on one terminal of a corresponding pair of said output terminals an output pulse train continuing for as long as the trackball has a component of rotation in the corresponding direction, the repetition rate and the duration of the pulses in said output pulse train varying with the pulse repetition rate of the associated set of pulse trains from the trackball device, said processor means in the second mode thereof having said output terminals arranged to provide two n-bit parallel output ports respectively corresponding to two orthogonal axes, where n is an integer greater than one, said processor means being responsive to each set of pulse trains for producing at one of said output ports n-bit parallel coded digital signals representative of a position along the corresponding axis.

10. The adapter of claim 9, and further including output means connected to said output ports of said processor means for converting each of said n-bit parallel coded digital signals to an analog signal proportional to the magnitude of the count represented by said n-bit parallel coded digital signal.

11. The adapter of claim 10, wherein n is eight.

12. The adapter of claim 10, wherein each of said n-bit parallel coded digital signals is converted to a DC level.

13. An adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said adapter comprising: input means for receiving the output signals of the trackball device; and processor means operating under stored program control and connected to said input means and having two pairs of output terminals respectively corresponding to two othogonal axes, the output terminals of each pair respectively corresponding to the opposite directions with respect to the associated axis, said processor means periodically sampling said input means to test for the presence of either of said sets of pulse trains, said processor means being responsive to the presence of a set of pulse trains at said input means for initiating a pulse output signal on one terminal of the corresponding pair of output terminals depending on the phase relationship of the pulse trains in the set, said processor means terminating said pulse output signal after a predetermined time.

14. The adapter of claim 13, wherein said predetermined time is substantially greater than the sampling period.

15. The adapter of claim 13, wherein said predetermined time is substantially less than the period of a set of pulse trains from the trackball device when the trackball device is rotating slowly in the corresponding direction, said predetermined time being the same order of magnitude as the period of a set of pulse trains from the trackball device when the trackball device is rotating rapidly in the corresponding direction.

16. The adapter of claim 13, wherein when said processor means initiates a pulse output signal on one terminal of a pair of output terminals it terminates any output signal which may be present at the other terminal of said pair of output terminals.

17. An adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said adapter comprising: input means for receiving the output signals of the trackball device; and processor means operating under stored program control and connected to said input means and having two n-bit parallel output ports respectively corresponding to 2 orthogonal axes, where n is an integer greater than one, said processor means establishing two binary counting chains respectively corresponding to said two axes wherein the zero and maximum counts of each counting chain respectively correspond to opposite end positions along the corresponding axis and producing respectively at said output ports two n-bit parallel coded digital output signals respectively representative of the counts of said two counting chains, said processor means initially setting each counting chain at a count midway between the zero and maximum counts thereof representative of a position midway between the end positions along the corresponding axis, said processor means periodically sampling said input means to test for the presence of either of said sets of pulse trains, said processor means being responsive to the presence of a set of pulse trains for incrementing or decrementing a corresponding one of said counting chains depending upon the phase relationship of the pulse trains of that set.

18. The adapter of claim 17, wherein n is eight.

19. The adapter of claim 18, wherein said 8-bit parallel output signals are in the hexadecimal code.

20. The adapter of claim 17, wherein said processor means is responsive to the presence of a set of pulse trains for checking the condition of the corresponding one of said counting chains and for incrementing or decrementing said counting chain only if it is not at either its zero or maximum count.

21. The adapter of claim 17, and further including output means connected to said output terminals of said processor means for converting each of said n-bit parallel coded digital signals to an analog signal proportional to the magnitude of the count represented by said n-bit parallel coded digital signal.

22. The adapter of claim 21, wherein said output means is a resistance ladder network.

23. An adapter for converting the output signals from a trackball-type position control device to a form compatible with an input port designed to receive the output of a joystick-type position control device, the trackball device output signals comprising four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said adapter comprising: input means for receiving the output signals of the trackball device; processor means operating under stored program control and connected to said input means and having a plurality of output terminals; and selector means associated with said processor means for selectively conditioning said processor means for operation in either of first and second modes; said processor means in the first mode thereof having two pairs of said output terminals respectively corresponding to two orthogonal axes, the output terminals of each pair respectively corresponding to the opposite directions with respect to the associated axis, said processor means periodically sampling said input means to test for the presence of either of said sets of pulse trains, said processor means being responsive to the presence of a set of pulse trains at said input means for initiating a pulse output signal on one terminal of the corresponding pair of output terminals depending on the phase relationship of the pulse trains in the set, said processor means terminating said pulse output signal after a predetermined time; said processor means in the second mode thereof having said output terminals arranged to provide two n-bit parallel output ports respectively corresponding to two orthogonal axes, where n is an integer greater than one, said processor means establishing two binary counting chains respectively corresponding to said two axes wherein the zero and maximum counts of each counting chain respectively correspond to end positions along the corresponding axis and producing respectively at said output ports two n-bit parallel coded digital output signals respectively representative of the counts of said two counting chains, said processor means initially setting each counting chain at a count midway between the zero and maximum counts thereof representative of a position midway between the end positions along the corresponding axis, said processor means periodically sampling said input means to test for the presence of either of said sets of pulse trains, said processor means being responsive to the presence of a set of pulse trains for incrementing or decrementing a corresponding one of said counting chains depending upon the phase relationship of the pulse trains of that set.

24. The adapter of claim 23, and further including output means connected to said output terminals of said processor means for converting each of said n-bit parallel coded digital signals to an analog signal proportional to the magnitude of the count represented by said n-bit parallel coded digital signal.

25. The adapter of claim 23, wherein when said processor means in the first mode thereof initiates a pulse output signal on one terminal of a pair of output terminals it terminates any output signal which may be present at the other terminal of said pair of output terminals.

26. The adapter of claim 23, wherein said processor means in the second mode thereof is responsive to the presence of a set of pulse trains for checking the condition of the corresponding one of said counting chains and for incrementing or decrementing said counting chain only if it is at neither its zero nor its maximum count.

27. The adapter of claim 26, wherein when said processor means in the first mode thereof initiates a pulse output signal on one terminal of a pair of output terminals it terminates any output signal which may be present at the other terminal of said pair of output terminals.

28. A method for converting the output signals from a trackball-type position control device to a form compatible with an input port designed to receive the output of a joystick-type position control device, wherein the trackball device output signals comprise four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said method comprising the steps of: providing two pairs of output terminals, initiating at each pair of output terminals an output signal in response to each pulse in one of the pulse trains in a corresponding one of the sets of trackball output pulse trains, said output signal being initiated at one terminal of said pair of output terminals if the phase relationship of the corresponding set of trackball output pulse trains corresponds to one direction and being initiated at the other terminal of said pair of output terminals if the phase relationship of the corresponding set of trackball output pulse trains corresponds to the opposite direction, and terminating each said output signal a predetermined time after its initiation unless during that predetermined time another output signal has been initiated by a subsequent pulse in the same trackball output pulse train.

29. A method for converting the output signals from a trackball-type position control device to a form compatible with an input port designed to receive the output of a joystick-type position control device, wherein the trackball device output signals comprise four pulse trains, with a set of two pulse trains for each of two components of rotation of the trackball respectively about orthogonal axes, wherein for each set of pulse trains the pulse repetition rate is related to the speed of rotation of the trackball about the corresponding axis and the phase relationship of the two pulse trains is related to the direction of rotation of the trackball about the corresponding axis, said method comprising the steps of: generating in response to each pulse of one of said pulse trains of each of said sets of trackball output pulse trains an n-bit parallel coded digital signal representative of a position along the corresponding axis, and converting each of said n-bit parallel coded digital signals to an analog signal representative of the same position along the corresponding axis.

* * * * *